May 22, 1956  S. W. BRIGGS  2,746,608
FILTER ELEMENT AND METHOD OF MAKING SAME
Filed March 16, 1951
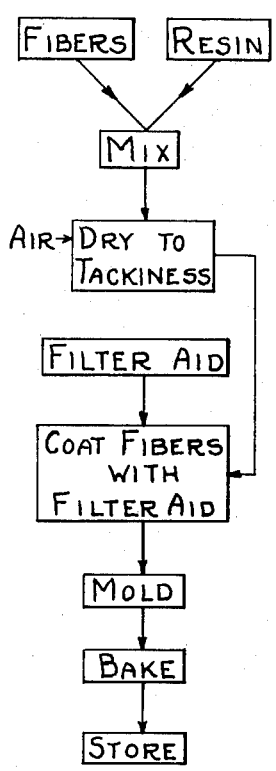
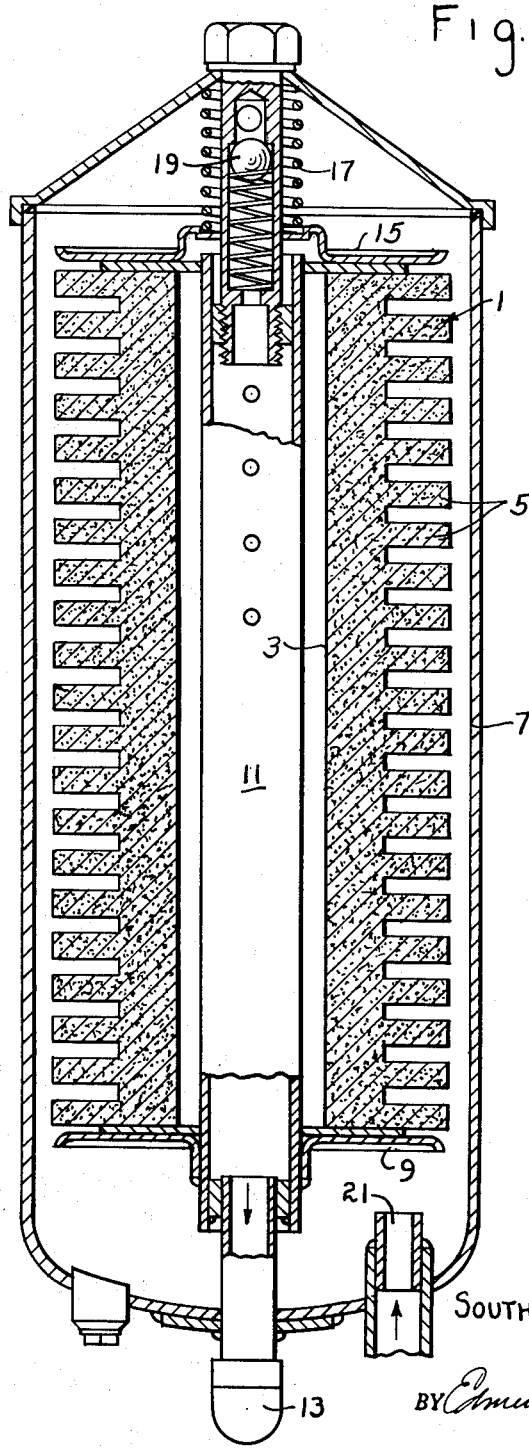
Fig. 1
Fig. 2
SOUTHWICK W. BRIGGS
INVENTOR.
BY
ATTORNEY 2,746,608
Patented May 22, 1956

2,746,608
FILTER ELEMENT AND METHOD OF MAKING SAME

Southwick W. Briggs, Washington, D. C.

Application March 16, 1951, Serial No. 215,961

15 Claims. (Cl. 210—205)

This invention relates to a filter element and the method of making same. More particularly, it relates to a filter element or refill made of discrete fibers which are coated with discrete particles of a filter aid material and to the process of manufacturing such an element by first coating the fibers to give them oil and water resistance, thereafter coating them with filter aid material and finally forming this material into an element.

It is an object of the invention to provide a filter element which is extremely efficient.

Another object is to provide a filter element which is water and oil resistant.

Still another object is to provide a filter element which has great structural strength.

A further object of the invention is to provide an element which has adsorptive powers.

Yet another object is to provide a filter element which is strong and rigid but in which the original properties of the filter aid material are not destroyed or materially impaired.

It is a further object of the invention to provide a filter element which will remove a great weight of impurities from a liquid in a given length of time.

These and other objects of the invention will become apparent from a study of this specification and the drawings which are attached hereto, made a part hereof and in which Figure 1 is an elevation in section showing the filter element enclosed in a case.

Figure 2 is a schematic view of the process of forming the filter block.

Referring to Figure 1, the filter block or element or cartridge 1 is shown as a cylindrical cartridge having a central opening 3 and radial ribs or flanges 5 formed on its outer or inlet side. The cartridge is mounted in a tank 7 on a head 9 and surrounds a perforated outlet tube 11 having a discharge pipe 13 connected therewith.

The block is held in place by an upper head 15 and is held in sealing relation with the heads by spring 17. A by-pass mechanism 19 is provided for allowing unfiltered liquid to pass to the outlet in case the element becomes plugged.

An inlet 21 for unfiltered liquid is provided in the tank.

The form of the filter block shown is, of course only one of the many forms which the element may take.

PROCESS

I prefer to manufacture the filter element by the process of coating a fiber such as shredded wood (i. e. fine excelsior), hemp, sisal, glass wool or the like with a resin which can be set or polymerized such as for example phenol furfural, melamine-formaldehyde, resorcinol-formaldehyde, lignin, phenol-formaldehyde and mixtures of urea formaldehyde and melamine.

A thin coating of resin is applied to the fiber by mixing the fibrous material with the resin in liquid solution. The coated material is then rendered tacky by adding dry resin and drying the mix to the required degree.

Next this material is coated with a filter aid material such as diatomaceous earth, cotton linters, fuller's earth, bauxite, etc., of the grade or size necessary to give the degree and type of filtration and color or acid correction required. This coating may be effected by mixing the dry filter aid with the tacky material.

The filter aid material is thus not coated with the resin but merely adheres to the fibers by having point contact with the coating.

The filter aid coated fibers are then compressed, preferably in a mold, to the shape and porosity desired in the filter element and the resin is polymerized or set as by baking the cartridge in an oven.

This process yields an element in which the filter aid material retains substantially its initial porosity and other qualities. By the term "filter aid material in its normal state" is meant a filter aid material which is in the form in which it is commercially sold for use as a filter aid which is not coated or otherwise treated. Further, in the case of a fiber which would adsorb water or oil, such adsorption is prevented or greatly reduced because the resin renders the fiber water and oil resistant.

Swelling and weakening of the fibers is thus prevented or greatly reduced with the result that, the structural strength, size and shape of the element as well as its porosity are maintained substantially constant.

The following exemplifies my process and one of the forms which my new filter element may take.

Mix approximately ten pounds of 60–100 mesh, kiln dried oak wood flour with about two pounds of liquid (60% solids) thermo-setting phenol-furfural resin for two or three minutes and add one pound, four ounces of dry, powdered phenol-furfural resin and mix for an additional two to three minutes.

Air dry the resulting mix for two hours.

To eleven pounds, eight ounces of the air dried mixture add one pound of diatomaceous earth and mix for three minutes.

Six pounds of this mixture are charged into a mold and compressed into a hollow, circular cylinder having an O. D. of 6⅛", an I. D. of 3" and a length of 13". The mold and contents are baked at approximately 375 degrees F. for 1½ to 1¾ hours after which the finished element is removed from the mold.

Comparative tests of two elements, one manufactured in accordance with the example just given and one in accordance with the example except that the diatomaceous earth was omitted, are set forth below to illustrate the effect of the incorporation of a filter aid in the element upon the weight of solids removed.

In this test, two elements were cemented together to make an element 26 inches long.

A. *No diatomaceous earth*

| Time, Hrs. | Lbs. Solids Removed | Gal./Min. Flow Rate | Diff. Press. |
|---|---|---|---|
| 1 | .56 | 1.62 | 21.0 |
| 3 | 1.13 | 1.09 | 21.5 |
| 5 | 1.59 | .96 | 22.0 |

B. *With diatomaceous earth*

| Time, Hrs. | Lbs. Solids Removed | Gal./Min. Flow Rate | Diff. Press. |
|---|---|---|---|
| 1 | 1.84 | 1.71 | 20.0 |
| 3 | 2.19 | .87 | 21.0 |
| 5 | 2.54 | .61 | 21.5 |

It is obvious that various changes may be made in the materials used, sequence of steps, temperatures, etc. of the process and in the form, shape and size of the element without departing from the spirit of the invention. Accordingly, I do not desire to be limited to the exact product and process disclosed herein; but instead, I desire protection falling fairly within the scope of the appended claims.

What I claim to be new and desire to protect by Letters Patent of the United States is:

1. The method of forming a filter block comprising the steps of coating a mass of fibers with a thin coat of polymerizable resin by mixing the fibers with a resin solution, partially drying the resin to render it tacky, uniformly coating said fibers by mixing a substantially dry filter aid material of selected particle size, thereafter compacting said coated fibers and heating the compacted mass to polymerize the resin, thereby rendering said fibers water and oil resistant.

2. The method of forming a filter block comprising the steps of coating by mixing a mass of fibers with a polymerizable resin, rendering said coating tacky, uniformly coating said fibers by mixing said fibers with a substantially dry filter aid material, compacting said mass and polymerizing said resin.

3. The method of forming a filter block comprising the steps of coating a mass of fibers with a thin coat of polymerizable resin by mixing the fibers with the resin, rendering said coating tacky, uniformly coacting said fibers by mixing said fibers with a substantially dry filter aid material by mixing said filter aid with the coated fibers, compacting said mass and polymerizing said resin.

4. The method of forming a filter block comprising the steps of coating a mass of fibers with a thin coat of polymerizable resin by mixing the fibers with the resin, rendering said coating tacky, uniformly coating said fibers by mixing said fibers with a substantially dry filter aid material, said material having substantially point contact with said coating, and remaining substantially uncoated with resin compacting said mass and polymerizing said resin.

5. The method of forming a filter block comprising the steps of coating a mass of fibers with a polymerizable resin by mixing the fibers with the resin, rendering said coating tacky, uniformly coating said fibers by mixing said fibers with a substantially dry filter aid material of selected particle size, compacting said mass and polymerizing said resin.

6. The method of forming a filter block comprising the steps of coating a mass of fibers with a thin coat of polymerizable resin by mixing the fibers with a solution of the resin, partially drying the resin to render it tacky, uniformly coating said fibers by mixing said fibers with a substantially dry filter aid material of selected particle size, compacting said coated fibers to secure the desired density and heating the compacted mass to polymerize the resin, thereby rendering said fibers water and oil resistant.

7. The method of forming a filter block comprising the steps of coating a mass of fibers with a thin coat of polymerizable resin by mixing the fibers with the resin, partially drying the resin to render it tacky by air drying, uniformly coating said fibers by mixing said fibers with a substantially dry diatomaceous earth, compacting said coated fibers to secure the desired density and heating the compacted mass to polymerize the resin, thereby rendering said fibers water and oil resistant.

8. The method of forming a filter block comprising the steps of coating a mass of fibers with a thin coat of polymerizable resin by mixing the fibers with the resin by mixing the fibers with a solution of the resin, partially drying the resin to render it tacky by adding dry resin, mixing and air drying the mixture, uniformly coating said fibers by mixing said fibers with a substantially dry filter aid material, said filter aid material having substantially point to point contact with said coating and remaining substantially uncoated with resin, compacting said coated fibers to secure the desired density and heating the compacted mass to polymerize the resin, thereby rendering said fibers water and oil resistant.

9. A filter block comprising a mass of fibers, a coating of resin on the fibers and a coating of filter aid material, in its normal state in which it is not coated or impregnated with resin, bound to said fibers by surface contact with said resin, said filter aid being uniformly distributed throughout the element and remaining substantially uncoated with resin.

10. A filter block comprising a mass of fibers, a coating of resin on the fibers and a coating of filter aid material, in its normal state in which it is not coated or impregnated with resin, bound to said fibers by surface contact with said resin, said filter aid being uniformly distributed throughout the filter block and remaining substantially uncoated with resin, said resin being polymerized.

11. A filter block comprising a mass of fibers, a thin coating of resin on the fibers and a coating of filter aid material, in its normal state in which it is not coated or impregnated with resin, bound to said fibers by surface contact with said resin, said filter aid being uniformly distributed throughout the filter block and remaining substantially uncoated with resin.

12. A filter block comprising a mass of fibers, a coating of resin on the fibers and a coating of filter aid material, in its normal state in which it is not coated or impregnated with resin, bound in substantial point contact to said fibers by said resin, said filter aid being uniformly distributed throughout the filter block and remaining substantially uncoated with resin.

13. A filter block comprising a compressed mass of fibers, a coating of resin on the fibers and a coating of filter aid material, in its normal state in which it is not coated or impregnated with resin, bound to said fibers by surface contact with said resin, said filter aid being uniformly distributed throughout the filter block and remaining substantially uncoated with resin.

14. A filter block comprising a compressed mass of fibers, a thin coating of polymerized resin on the fibers and a coating of filter aid material, in its normal state in which it is not coated or impregnated with resin, bound in substantial point to point contact to said fibers by said resin, said filter aid being uniformly distributed throughout the filter block and remaining substantially uncoated with resin.

15. An article of manufacture comprising a filter cartridge having a compressed mass of fibers, said fibers having a thin coating of polymerized resin and a coating of filter aid material, said filter aid material being in finely divided particles in which it is not coated or impregnated with resin, said particles being bound in substantial point to point contact to said fibers by said resin, said filter aid being uniformly distributed throughout the cartridge and remaining substantially uncoated with resin.

References Cited in the file of this patent

UNITED STATES PATENTS

| 1,444,956 | De Cew | Feb. 13, 1923 |
| 1,753,277 | Sweetland | Apr. 8, 1930 |
| 1,810,729 | Rafton | June 16, 1931 |
| 1,944,550 | Ericson | June 23, 1934 |
| 2,114,393 | Lane | Apr. 19, 1938 |
| 2,148,709 | Orr | Feb. 28, 1939 |
| 2,243,296 | Sweetland | May 27, 1941 |
| 2,266,313 | Ehlers et al. | Dec. 16, 1941 |
| 2,337,574 | Sloan et al. | Dec. 28, 1943 |
| 2,349,469 | Sloan | May 23, 1944 |
| 2,539,767 | Anderson | Jan. 30, 1951 |
| 2,539,768 | Anderson | Jan. 30, 1951 |